A. PACKARD.
Fastening Stove Linings.

No. 68,383. Patented Sept. 3, 1867.

WITNESSES:
H. Williamson
R. H. Seaton

INVENTOR:
Austin Packard,
By How & Weston
Attys.

AUSTIN PACKARD, OF BROOKLYN, NEW YORK.

Letters Patent No. 68,383, dated September 3, 1867

SECURING LININGS IN STOVES.

The Schedule referred to in these Letters Patent and making part of the same.

TO ALL WHOM IT MAY CONCERN:

Be it known that I, AUSTIN PACKARD, of Brooklyn, in the county of Kings, and State of New York, have made certain new and useful improvements in Securing Linings in Stoves, Furnaces, &c.; and I do hereby declare that the following is a full, clear, and exact description thereof, reference being had to the accompanying drawings, and to the letters of reference marked thereon.

The object of my invention is to provide a better, cheaper, and more efficient method or means of fastening brick or soapstone linings in the fire-pots or fire-boxes of stoves, furnaces, cabooses, and other places where such linings are or may be used.

It consists in "matching" the bricks or pieces by means of tongues and grooves in their vertical joints, and forming a similar joint where their lower edges rest on the projection or flange made to receive them, either by a tongue and groove, or by making a projecting ridge or L, either on the bricks or pieces of soapstone, or on the said flange, and providing a corresponding depression to receive said flange or L, in such a manner that the joint such formed will prevent the bottom of the bricks or pieces of soapstone from falling inwards, or otherwise getting out of place, while the tongues and grooves in the vertical joints will prevent the tops of said bricks or pieces from becoming loose, the bricks, when in position, being forced together by wedges driven in between the edges of the side bricks and the end bricks, substantially as hereinafter set forth. In the accompanying drawings—

Figure 1:
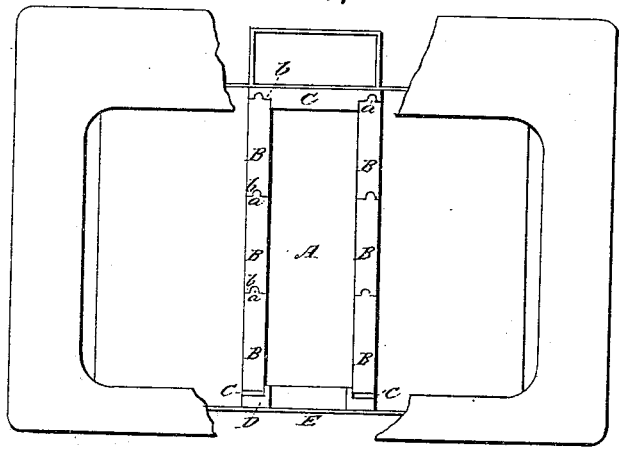
Figure 1 is a plan of a range containing or embodying my invention.
Figure 2:
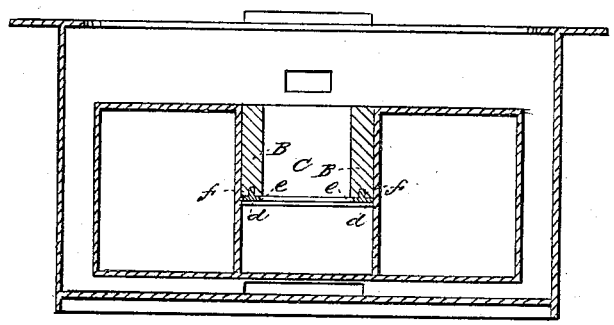
Figure 2 is a vertical cross-section, showing the bottom joint made by a tongue and groove.
Figure 3:
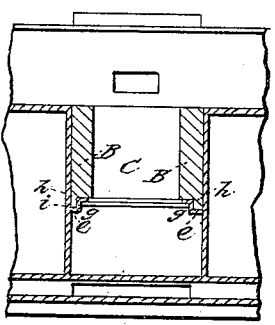
Figure 3 is a vertical cross-section of the fire-box, the other parts being broken away, and showing the bottom joint made by an L on the shelf on which the bricks rest, and a projection on the back of the bricks which fits in behind said L.
Figure 4:
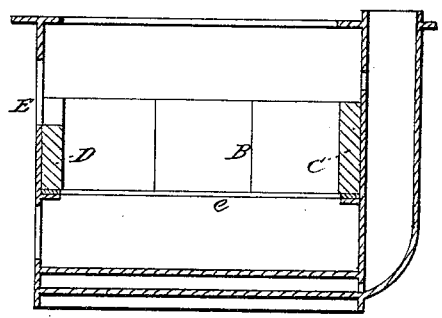
Figure 4 is a vertical section from front to rear, the lower joint being formed as in fig. 2.

A is the fire-box of the range, and B the soapstone or fire-brick lining at the sides. C is the lining at the back end, and D that at the front end. In fig. 1 is shown the manner of forming the vertical joints, which are made by providing a tongue, $a$, on one edge of each piece, which fits into a groove, $b$, on the adjacent edge of the next piece, the last resting in a groove in the end piece C. The end pieces C and D are joined to the sides by rabbets, and at one end wedges, $c\ c$, are driven in to hold the whole lining snugly in its place. The base of the side linings B is held from slipping out by a projecting ledge, flange or tongue, as seen in the drawings, or fig. 2 a tongue, $d$, is thrown up, or made on the shelf or flange $e$, and a corresponding groove, $f$, is made in the one part, and a corresponding depression on the other part, into which such ledge, flange, or tongue fits. In the modification shown in fig. 3 an L soapstone or fire-brick, into which groove the said tongue fits. In the modification shown in fig. 3 an L flange, $g$, is thrown up on the outer edge of the shelf $e$, and a corresponding depression or rabbet, $h$, is made inner corner of the soapstone or fire-brick B, so that when the soapstone or fire-brick is set in its place on shelf $e$, the projecting portion $i$ sets in behind the projecting flange $g$, and prevents the fire-brick or soapstone from slipping out of place. The piece D is cut away to give access to the fire-pot through the door E.

By the use of the above-described method of fastening the brick or soapstone linings into the fire-box of fire-pots of stoves, ranges, cabooses, &c., the upper iron flange for holding the tops of the fire-bricks in places is dispensed with, and the lining held with as much or more security than by the old way, while the construction is cheaper and more durable.

The removal of a broken or defective brick or piece of soapstone is also rendered much easier than old way, where a top flange is used.

I claim as my invention—

Fastening or securing fire-brick or soapstone linings in the fire-boxes or fire-pots of stoves, ranges cabooses, or in other places where such linings are or may be used, substantially as hereinbefore set forth.

AUSTIN PACKARD

Witnesses:
THOS. P. HOW,
H. JAMES WESTON.